United States Patent [19]

Sieswerda

[11] 3,717,210
[45] Feb. 20, 1973

[54] BALANCE
[75] Inventor: Bauke S. Sieswerda, Geleen, Netherlands
[73] Assignee: Stamicarbon N.V., Heerlen, Netherlands
[22] Filed: March 25, 1971
[21] Appl. No.: 77,697

Related U.S. Application Data
[63] Continuation-in-part of Ser. No. 794,219, Jan. 27, 1969, abandoned.

[30] Foreign Application Priority Data
Jan. 25, 1968 Netherlands ........................6801105

[52] U.S. Cl. ..................177/196, 177/212, 177/245, 177/DIG. 9
[51] Int. Cl. ..............................................G01g 7/00
[58] Field of Search......177/194, 196, 203, 212, 245, 177/246, 255, DIG. 9

[56] References Cited

UNITED STATES PATENTS

| 262,905 | 8/1882 | Roader | 177/196 |
| 340,010 | 4/1886 | Springer | 177/196 |
| 340,007 | 4/1886 | Roader | 177/196 |
| 2,407,513 | 9/1946 | Pounds | 177/194 X |
| R26,100 | 10/1966 | Cahn | 177/212 X |
| 2,040,729 | 5/1936 | De Cissey | 177/245 X |

Primary Examiner—Richard B. Wilkinson
Assistant Examiner—George H. Miller, Jr.
Attorney—Cushman, Darby & Cushman

[57] ABSTRACT

A thermogravimetric balance comprising a vertically disposed load carrying arm connected at each end through tension wires to first and second horizontally disposed balance arms connected at their mid-points to tension strips or wires. The other ends of the balance arms are linked through tension wires to a connecting element so that the balance arms, load carrying arm and connecting element comprise a vertically disposed parallelogram. Rotation of said first balance arm out of its equilibrium position will actuate a control circuit which will effect the application of a restoring movement to the balance arm, the amount of current required to restore the balance arm being used as a measure of the weight value. Dimensional variations due to temperature changes in the load carrying arm are compensated for by effecting compensating movement in the parallelogram structure.

2 Claims, 1 Drawing Figure

PATENTED FEB 20 1973　　　　　　　　　　　　　3,717,210
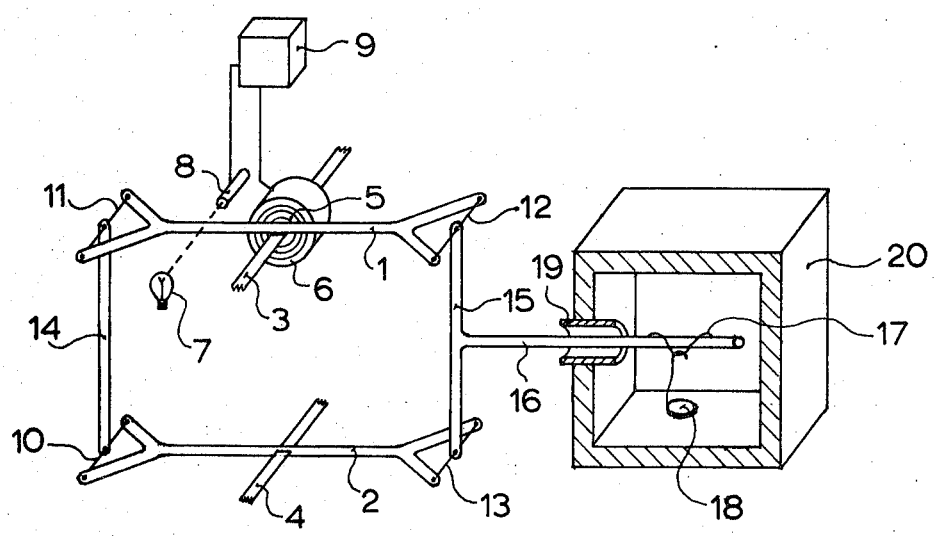
INVENTOR
BAUKE S. SIESWERDA

BALANCE

This application is a continuation-in-part of Ser. No. 794,219, filed on Jan. 27, 1969, now abandoned.

This invention relates to a balance comprising a balance arm suspended at a point between the ends on a horizontal tension wire, and a load carrying member which, likewise by means of a tension suspensory wire, is connected with said arm. The term "wire" as used in this specification may also be taken to mean a narrow strip.

In the balances used in the prior art, it has not been possible to compensate for the effect of temperature changes on the length of the balance arm except by attempting to minimize this effect by constructing the arm of quartz glass. Moreover, with the load placed in a thermostated enclosure, weighing is often difficult to realize in using the prior art arrangements, and, especially in the case of portable balances and thermogravimetric determinations, great difficulties are encountered. In addition, a thermostated enclosure is expensive and inconvenient, because it adds considerably to the time needed for the determinations.

Another drawback of the known balances is that the load is liable to swing. Frequently, the need is felt for a non-oscillating load pan whose horizontal position is not inconveniently changed by the placement of the load, so that the placement has no effect on the measuring result. The present invention provides a simple, efficient and sturdy construction that does not present the difficulties mentioned above.

Said construction is characterized in that it comprises a second arm suspended on a tension wire, the two arms constituting opposite sides of a vertically disposed parallelogram, the two other sides of which are formed by connecting elements at least one of which is rigid and constructed to form the load carrying member, and in that two adjacent sides of the parallelogram are connected to each other by means of a tension wire which, intersecting the said plane, is secured to a duplicate part of one of the sides, and, at a point intermediate between the ends of said tension wire, is secured to the other side.

With low-sensitivity balances it is customary to use the parallelogram principle. However, all fulcrums are constructed as knife edges. The combination according to this invention has the apparent drawback that horizontally directed forces may be produced at the attachment points of the load-carrying member, and these forces may change the effective lengths of the balance arms, and, hence, the torque acting on one of the balance arms which is to be determined and used as a measure of the weight.

However, the effect of the horizontally directed forces is cancelled out as will be made clear in the following description.

In platform weighing machines, the placement of the load in balances of the type covered by the invention is no longer a consideration. It will be seen that the load arm may, if so desired, be fitted with a platform on which the load may be placed in any arbitrary position. In thermogravimetric balances, the end of the arm usually carries a vertically disposed load carrying member, which extends either into a superposed heating enclosure, or into a cooling well disposed under said arm. Although its very design already entails several disadvantages (e.g., as regards the spatial arrangement), the construction presents one major problem, namely, the impossibility of applying successive cooling and heating in one measurement. In a balance according to this invention, however, the load-carrying member can be provided with a horizontal load arm which at one end is surrounded by an enclosure for thermal treatment of the load, because changes in the length of the load arm are compensated for by the parallelogram arrangement. The enclosure may now be made much lower, so that during measurements in gases much less turbulence is liable to occur.

The enclosure within which exclusively annealed parts are disposed can be effectively sealed from the exterior atmosphere by running the part of the load arm traversing the wall of the enclosure through a tube with capillary clearance, i.e., a clearance so small that gas molecules are capable of passing through it by diffusion only. If desired, said tube may be cooled to condense deleterious gases so as to keep them from penetrating into the enclosure.

The invention will now be elucidated with reference to the drawing, which shows in perspective a view of the balance of the present invention used for thermogravimetric determinations.

Two balance arms 1 and 2 are disposed over one another on tension wires—here represented as tensioned strips—3 and 4. Balance arm 1 connects with a measuring coil 5 placed in a measuring block 6. The equilibrium position is checked by means of a lamp 7 and a lightsensitive detector 8. Housing 9 accommodates a control circuit, which controls the current so as to produce the correct equilibrium torque, and indicates and/or records the weighing result.

The balance arms 1 and 2 are provided at each of their ends with duplicate members in which tension wire (10, 11, 12, 13) is secured. Between tension wires 10 and 11 and between 12 and 13, connecting members 14 and 15 respectively are arranged; member 15 also constitutes the load carrying member. Arms 1 and 2 and the connecting elements 14 and 15, constitute a parallelogram. Attached to load carrying member 15 is a horizontal load arm 16, which carries a shackle 17 on which the pan 18 is suspended.

In the operation of the balance as thus described, when there has been no distortion of load arm 16 due to a temperature variation, placing of an object to be weighed on pan 18 will cause a right-hand torque to be applied to load carrying member 15 which is transmitted through tension wires 12 and 13 to balance arms 1 and 2. As viewed in the drawing, movement of the left-hand portion of balance arm 1 will permit light from lamp 7 to impinge upon detector 8. Excitation of detector 8 will cause the control circuit located in housing 9 to deliver a measured quantity of current to measuring coil 5 which functions to apply a restoring torque to balance arm 1 so that balance arm 1 will be returned to its equilibrium position in which illumination of the detector 8 will be cut off. The current supplied by the control circuit to measuring coil 5 can be calibrated to correspond to weight values which may be indicated or recorded by the control circuit by any conventional means.

The masses and the respective geometrical dispositions of the elements of the parallelogram as well as the load arm 16, together with the amount of tension in the wires 10, 11, 12, and 13, are selected so that, in operation of the balance, when arm 16 has not been distorted by temperature changes, arm 15 will transmit the load created by the disposition of an object on pan 18 to arms 1 and 2 without changing the effective length of the arms between their respective connections with the tension strips 3 and 4 and their points of attachment with the tension wires 10, 11, 12 and 13.

Arm 16 extends through a tube 19 whose diameter is such that the clearance between the tube and the arm is of a capillary nature. The tube is fitted in the wall of an enclosure 20 for thermal treatment. This enclosure can be cooled as well as heated.

If the load arm 16 is distorted by heating, or unbalanced by a shifting of shackle 17 to the right in the drawing, an additional right-hand torque will be applied to load carrying member 15. As a result tension wire 12 deflects slightly to the right, and thus increases the effective length of the arm 1 between tension strip 3 and the attachment point of load carrying member 15 on tension wire 12. This produces a right-hand torque on the measuring coil 5.

Tension wire 13 deflects slightly to the left, with the result that a left-hand torque is applied to the arm 2. This produces a tensile force in connecting member 14, so that a left-hand torque is applied to arm 1 and, hence, to the measuring coil 5. This torque compensates for the above-mentioned right-hand torque on measuring coil 5 caused by the distortion or extension of arm 16, from which it follows that in the present invention a change in the length of arm 16 has no effect whatsoever on the measuring result.

It will be seen, that, for every increase in the effective length of the right-hand portion (as seen in the drawing) of balance arm 1, there will be a compensating shortening of the right-hand portion of balance arm 2 so that the left-hand portion of balance arm 2 will tend to pivot downwardly about strip 4 which movement is transmitted through member 14 to the left-hand portion of balance arm 1 to effectively cancel out the downwardly directed pivoting force on the right-hand portion of balance arm 1 so that the only weight or force influencing the pivoting of balance arms 1 and 2 will be the weight of the object located on pan 18.

It will be evident, therefore, that shackle 17 may be shifted, or be replaced by a pan on which the position of the load may be chosen at will.

The expansion coefficient of the material of arm 16 is likewise unimportant, so that the arm may be constructed of a wide range of materials. To give an idea of the principal dimensions of the embodiment: the balance arms 1 and 2 are 7 cm long, the connecting elements 14 and 15, 5 cm and the load-carrying arm 16, 25 cm.

The parts of the balance within enclosure 20 are annealed, those external to the enclosure are not. The pressure in the enclosure is equal to, or slightly higher than the external pressure. A vacuum pressure is also admissible. The material of the constructional parts may contain traces of gas, which, especially when a vacuum is maintained in the enclosure, may be set free and thus interfere with the determination. The annealing treatment has removed these traces of gas as thoroughly as possible. Capillary tube 19 effectively keeps traces of gas from entering enclosure 20, and allows sufficient freedom of movement to arm 16.

The balance according to the invention can detect differences in weight equal to 0.1 $\mu$g. However, the invention is not limited to microbalances but can be applied with good success also to balances in general.

Instead of being secured in parts of the arms 1 and 2, the tension wires 10, 11, 12, and 13 may also be fixed in parts of the connecting elements 14 and 15.

The arms of the connecting pieces bearing the tension wires need not be forked as shown in the drawing; they may also be made double, either completely or for the greater part.

What is claimed is:

1. A balance comprising a balance arm suspended at a point between the ends on a horizontal tension strip, and a load carrying member which, by means of a suspensory tension wire, is connected with said arm, characterized by a second arm suspended on a tension strip, the two arms constituting opposite sides of a parallelogram disposed to lie in a vertical plane whose two other sides are formed by connecting elements at least one of which is rigid and constructed to form the load carrying member, and in that two adjacent sides of the parallelogram are connected to each other by means of a tension wire, which, intersecting the said plane, is secured to duplicate parts of one of the sides, said duplicate parts being equally spaced on opposite sides of the plane and, at a point intermediate between the ends of said tension wire, is secured to the other side, said load carrying member having a horizontal load arm, the end of which extends into an enclosure for thermal treatment of the load.

2. A balance according to claim 1, wherein that part of the load arm traversing the wall of said enclosure is disposed to extend through a tube, the dimensions of said tube and said arm being such that there is a capillary clearance between said tube and said arm.

* * * * *